United States Patent [19]
Takei et al.

[11] Patent Number: 6,068,338
[45] Date of Patent: May 30, 2000

[54] HEADREST FOR A VEHICLE SEAT

[75] Inventors: Yoshiyuki Takei; Terumasa Saitoh, both of Akishima, Japan

[73] Assignee: Tachi-S Co., Ltd., Tokyo, Japan

[21] Appl. No.: 09/250,790

[22] Filed: Feb. 12, 1999

[51] Int. Cl.[7] .................................................. A47C 7/36
[52] U.S. Cl. .......................................... 297/391; 297/220
[58] Field of Search .................................. 297/391, 397, 297/220, 221

[56] References Cited

U.S. PATENT DOCUMENTS

| | | | |
|---|---|---|---|
| 4,003,599 | 1/1977 | Takamatsu | 297/391 X |
| 4,848,836 | 7/1989 | Masui | 297/220 |
| 5,165,754 | 11/1992 | Louys | 297/391 |
| 5,452,939 | 9/1995 | Kupisz et al. | 297/391 |
| 5,478,136 | 12/1995 | Takeuchi et al. | 297/391 |
| 5,927,814 | 7/1999 | Yoshimura | 297/391 |

*Primary Examiner*—Peter M. Cuomo
*Assistant Examiner*—Rodney B. White
*Attorney, Agent, or Firm*—Browdy & Neimark

[57] ABSTRACT

A headrest of the type formed by a foaming process of placing a generally "M" shaped headrest frame having a pair of stay portions in a three-dimensional bag-like trim cover assembly, then injecting a liquid foaming base material into within the trim cover assembly and creating a foam padding therewithin together with the headrest frame and trim cover assembly, with the two stay portions projecting outwardly from one side of the trim cover assembly via the respective two through-holes. The headrest has an opening formed in that one side of trim cover assembly where the two through-holes lie. The opening is disposed between the two through-holes and has a small width relative to a width of the same two through-holes, thereby minimizing the possibility that the liquid foaming base material will be leaked from the opening during the foaming process.

11 Claims, 3 Drawing Sheets

HEADREST FOR A VEHICLE SEAT

BACKGROUND OF INVENTION

1. Field of the Invention

The present invention relates to a headrest for use in a vehicle or automobile, and is particularly directed to such a headrest that is formed by a foaming process by placing a generally "M"-shaped headrest frame with two stay portions within a trim cover assembly, then injecting a liquid foaming base material into the trim cover assembly, and curing the foaming base material together with the headrest frame and trim cover assembly integrally, thereby providing a headrest with two stays which can be used on a vehicle seat.

2. Description of Prior Arts

For example, the Japanese Laid-Open U.M. Publication No. 59-139157 discloses the foregoing kind of headrest having a generally "M" shaped headrest frame. According thereto, such headrest frame has a pair of stay portions which are projected outwardly from a trim cover assembly forming a part of headrest body. The generally "M" shape of headrest frame is advantageous in eliminating the need to provide a reinforcing rod between two lateral frame sections of the headrest frame in view of the "M" shaped part serving as the reinforcing rod, and also advantageous in permitting easy insertion of the headrest frame itself into within the trim cover assembly.

However, this sort of headrest has been found defective in that it is necessary to form a large opening in the trim cover assembly, which is so sufficient to allow the whole "M" shaped headrest frame to be inserted therethrough into within the trim cover assembly, and that, due to such large opening, during a foaming process, a liquid foaming base material will be leaked from the opening, which results in impairing an aesthetic outer appearance of headrest.

SUMMARY OF THE INVENTION

In view of the above-stated drawbacks, it is a purpose of the present invention to prevent leakage of a liquid foaming base material in a headrest of the type formed by placing a generally "M"-shaped headrest frame with two stay portions within a three-dimensional bag-like trim cover assembly, then injecting a liquid foaming base material into the trim cover assembly, and curing the foaming base material together with the headrest frame and trim cover assembly integrally.

To achieve such purpose, in accordance with the present invention, the headrest of such kind basically comprises:

- a cover section of the three-dimensional bag-like trim cover assembly which forms one side of that particular trim cover assembly;
- a pair of through-holes formed in the cover section, through which the two stay portions pass, respectively, and project outwardly of that one side of trim cover assembly; and
- an opening means so arranged in the cover section as to be disposed between the two through-holes and be normally so biased as to be closed, which opening means has a small width relative to a width of the two through-holes.

Accordingly, the small width of opening means than that of two through-holes or two stay portions is effective in reducing the possibility that the liquid foaming base material will leak through the opening means during the foaming process, in comparison with the above-described conventional headrest.

In one aspect of the present invention, the opening means is of a size allowing an inner side of the trim cover assembly to be taken out therefrom and therethrough so as to permit reversing of the trim cover assembly.

In another aspect of the invention, the cover section may include a pair of cover sections, and a pair of extensions may each be formed with the respective two cover sections, such that the pair of extensions project inwardly of the trim cover assembly such as to be biasingly contacted with each other therewithin and that the opening means comprises an elongated opening defined between the two extensions.

Other features and advantages of the present invention will become apparent from reading of the descriptions hereinafter, with reference to the annexed drawings.

DETAILED DESCRIPTION OF PREFERRED EMBODIMENTS OF THE INVENTION

Figure 1:
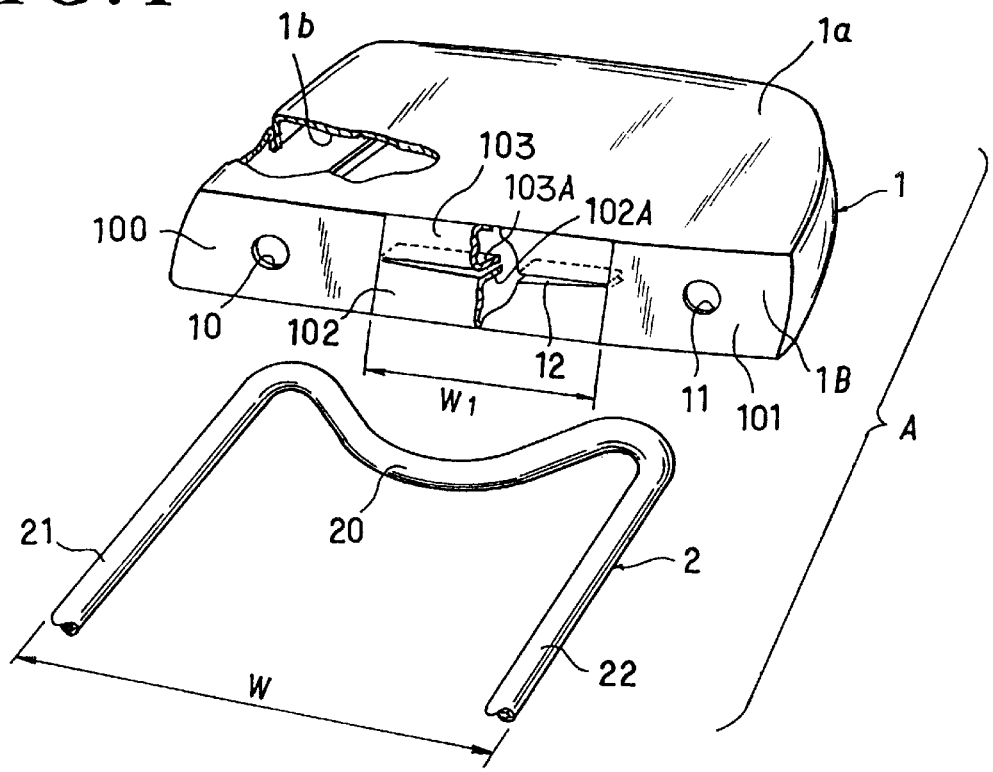
FIG. 1 is a partly broken, exploded schematic perspective view of one embodiment of headrest in accordance with the present invention, which shows a trim cover assembly and headrest frame prior to a foaming process.
Figure 2:
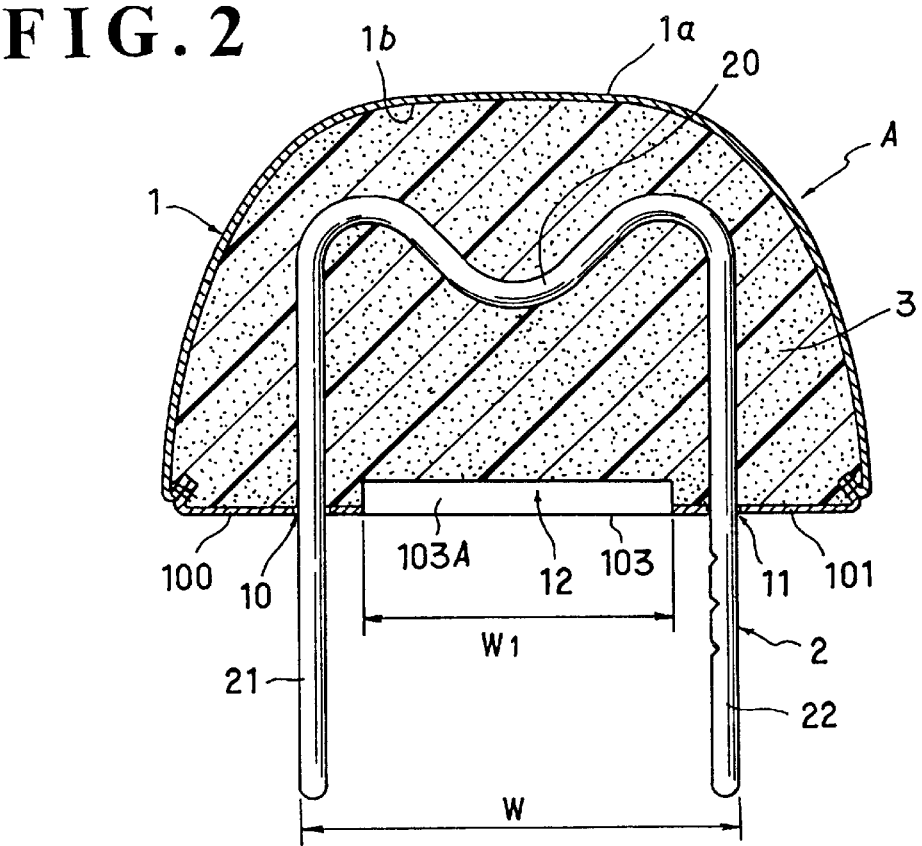
FIG. 2 is a sectional view of a resultant headrest formed by foaming an assembly on the trim cover assembly and headrest frame shown in FIG. 1.
Figure 3:
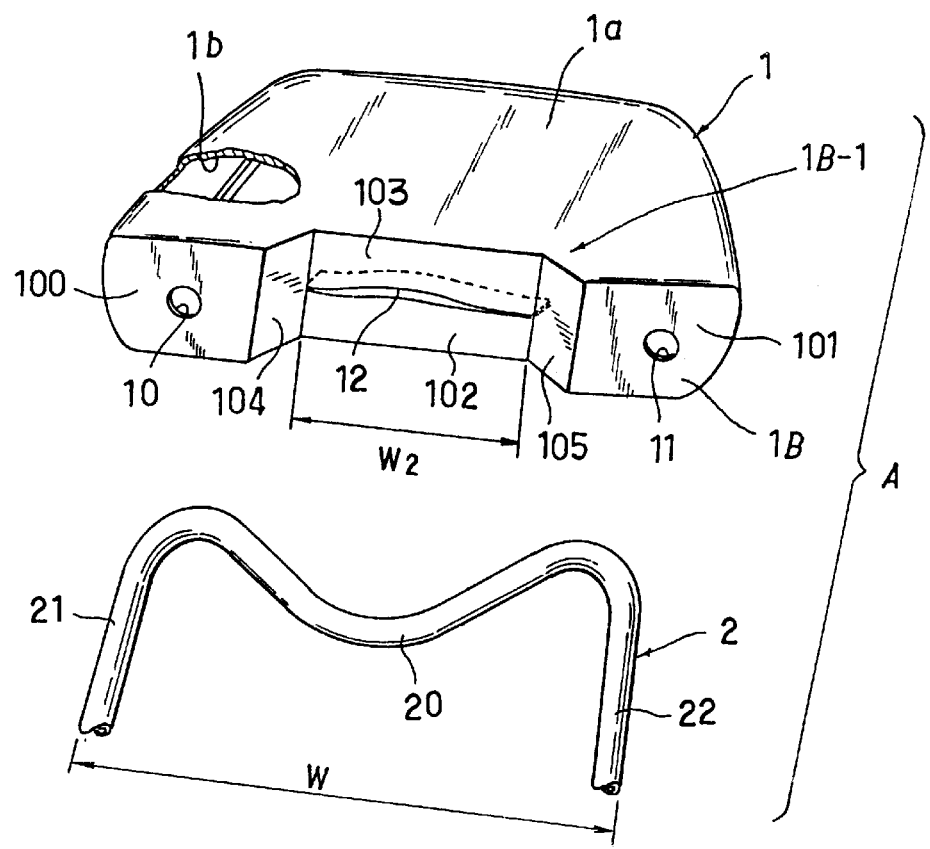
FIG. 3 is a partly broken, exploded schematic perspective view of alternative embodiment of headrest in accordance with the present invention, which shows a trim cover assembly and headrest frame prior to a foaming process

Referring to FIGS. 1 through 6, there are illustrated preferred embodiments of headrest for use on a vehicle seat in accordance with the present invention, as generally designated by (A), which can be divided into two non-distinctive modes, one of which is shown in FIGS. 1 and 2, and another of which is shown in FIGS. 3 to 6. It should be understood that those two modes are merely examples where the inventive concept of the present invention to become apparent hereinafter may be commonly applied to both two types of headrest, each being typically shown in FIGS. 1 and 3, respectively, as will be described later.

FIGS. 1 and 2 show a basic structure of headrest, as generally designated by (A), of the type having a flat lower side (1B) which is to be assembled with a generally "M" shaped headrest frame (2) and is then to be subjected to a foaming process. The headrest frame (2) is a known "M" shaped headrest frame stated previously, which comprises a generally "M" shaped part (20) and a pair of lateral frame sections or stay portions (21)(22) adapted for connection with a suitable stay holder (not shown) mounted on a vehicle seat (not shown).

According to this embodiment, designation (1) denotes a trim cover assembly which forms a part of headrest (A). As can be seen in FIG. 1, the trim cover assembly (1) has been formed into a generally closed bag-like configuration of three dimension by sewing separate cover sections together, which has a flat lower side (1B). Although not shown, prior to providing the headrest trim cover assembly, as found normally in forming this kind of closed three-dimensional trim cover assembly, the cover section materials have been turned over, in advance, to expose their respective reverse sides (see (1b) in FIG. 1) outwardly thereof, while orienting their respective outer sides (see (1a) in FIG. 1) inwardly thereof, and then sewn together into a reversed three-dimensional trim cover assembly.

In accordance with the present invention, the lower side (1B) of trim cover assembly (1) is formed with a pair of spaced-apart through-holes (10)(11) and an elongated opening (12). More specifically, as shown in FIG. 1, the lower side (1B) of trim cover assembly (1) is formed by sewing together a pair of first and second cover sections (100)(101) and a pair of third and fourth cover sections (102)(103) in the illustrated flat fashion, such that two extensions (102A)(103A) respectively of the third and fourth cover sections (102)(103) project in one direction from a plane of the trim cover assembly lower side (1B) in such a manner as to be contacted with each other. The elongated opening (12) is therefore defined between those two extensions (102A)(103A). In accordance with the present invention, such opening (12) is of a small width (W1) relative to a width (W) of the headrest frame (2). The two throughholes (10)(11) are formed in the first and second cover sections (100)(101), respectively, and spaced apart from each other a distance generally equal to the width (W) of headrest frame (12), so that the two two stay portions (21)(22) may be passed through the respective through-holes (10)(11).

The thus-formed three-dimensional trim cover assembly (1) is initially, as stated earlier, in the state of being reversed, such that both of the reverse side (1b) and two extensions (102A)(103A) thereof are exposed outwardly, though not shown. FIG. 1 shows the trim cover assembly (1) which is provided by turning over such initially reversed trim cover assembly (1), such that its outer side (1a) is exposed outwardly while the two extensions (102A)(103A) project inwardly of the trim cover assembly body. In brief, such turning-over of reversed trim cover assembly can be effected by simply taking out the outer side (1a) thereof, which lies inwardly of the reversed trim cover assembly, from and through the elongated opening (12) to the outside, so that whole outer side (1a) is exposed outwardly, while the reverse side (1b) is situated within the trim cover assembly body, as in FIG. 1.

It is noted that the trim cover assembly (1) is of a three-layer lamination structure comprising a top cover layer, a wadding layer and a back cloth layer, through not shown, which is effective in giving an elasticity to the two extensions (102A)(103A) so that they are biased resiliently into contact with each other, thereby normally closing the opening (12).

In the process for forming a headrest (A), at first, as viewed from FIG. 1, one stay portion (21) of headrest frame (2) is inserted via the opening (12) into within the trim cover assembly (1) and then projected from one through-hole (10). Next, by continuing on to insert the headrest frame (2) into within the trim cover assembly (1), the generally "M" shaped part (20) of headrest frame (2) is placed within the trim cover assembly (1), while such one stay portion (21) projects from the through-hole (10) at the generally whole length thereof, so as to allow insertion of another stay portion (22) via the opening (12) into within the trim cover assembly (1). Then, such another stay portion (22) is passed through another through-hole (11), projecting therefrom to the outside. In that way, the headrest frame (2) is placed in the trim cover assembly (1) as can be seen from FIG. 2, with the two stay portions (21)(22) projecting outwardly from the lower side (1B) of trim cover assembly (1). Thereafter, the thus-assembled incomplete headrest unit is set in a suitable known foaming die device (not shown), and a liquid foaming base material (not shown) is injected into the inner hollow of trim cover assembly (1). A foaming is then effected to cure the foaming material to create a foam padding (3) integrally with both trim cover assembly (1) and headrest frame (2), whereupon a headrest (A) is produced. During the foaming process, an increased mass of cured base foaming material presses the two extensions (102A)(103A) from both sides to close the opening (12) more tight, which serves to prevent leakage of the base foaming material through the opening (12).

In accordance with the present invention, the fact that the width (W1) of elongated opening (12) is smaller than the width (W) of headrest frame (2) or of the two through-holes (10)(11) is advantageously effective in more reducing the possibility that the liquid foaming base material injected in the trim cover assembly (1) will be leaked from the opening (12), during the foaming process, in comparison with the conventional headrest structure wherein an opening of a greater width than that of such opening (12) is provided.

Figure 4:
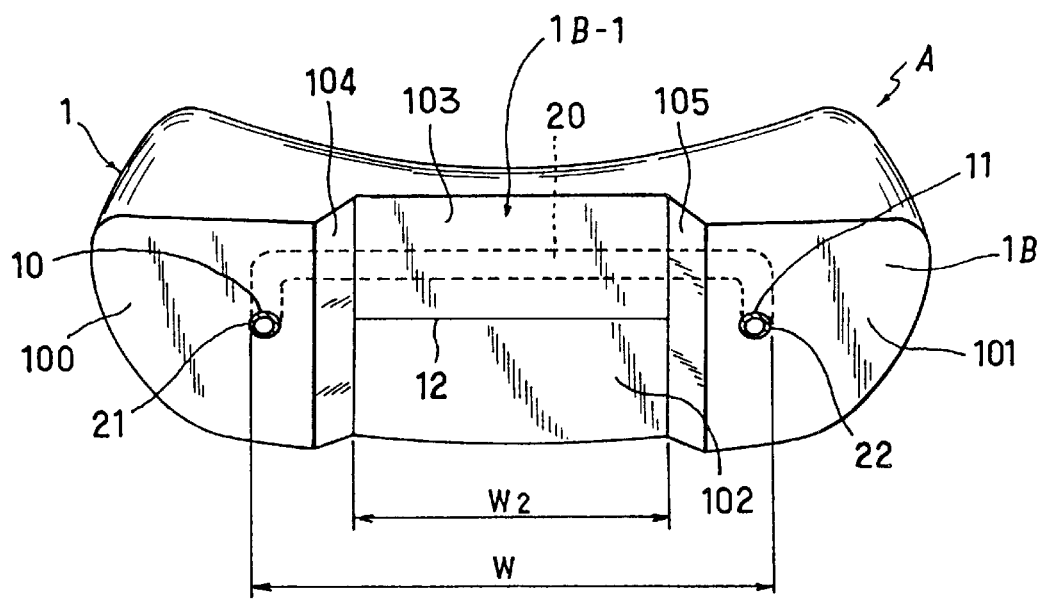
FIG. 4 is a partly broken bottom view of a resultant headrest formed by foaming an assembly on the trim cover assembly and headrest frame shown in FIG. 3.
Figure 5:
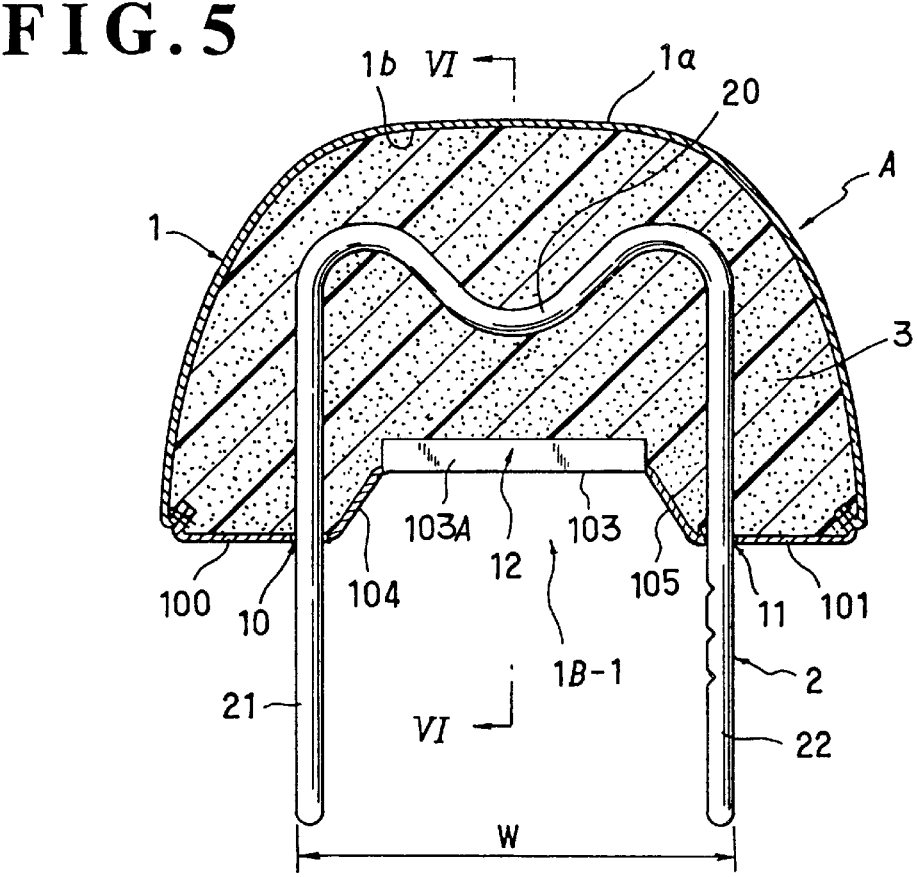
FIG. 5 is a sectional view of the resultant headrest shown in FIG. 4.
Figure 6:
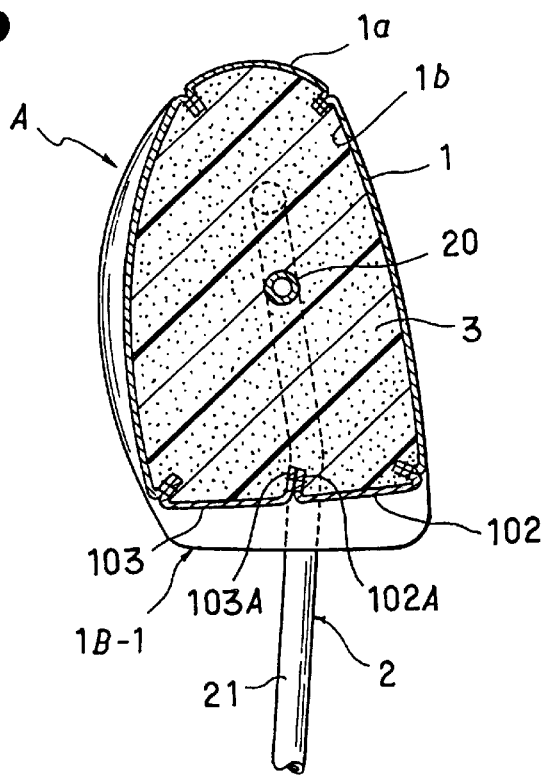
FIG. 6 is a sectional view taken along the line VI—VI of FIG. 5.

FIGS. 3 to 6 show another mode of headrest (A) of the known type having a recessed area (1B-1) at the lower side (1B), which is designed to improve a support touch for supporting the head of person who uses this headrest. The present mode of headrest (A) only differs from the above-described first mode in that the lower side (1B) thereof is formed in a fashion contoured along the recessed area (1B-1) by sewing together a pair of first and second flat cover sections (100)(101), a pair of intermediate inclined or vertical cover sections (104)(105) and a pair of third and fourth flat cover sections (102)(103), such that two extensions (102A)(103A) respectively of the third and fourth cover sections (102)(103) project in one direction from a plane of the recessed area (1B-1) where those two particular cover sections (102)(103) lie, in such a manner as to be contacted with each other. The elongated opening (12) is therefore defined between those two extensions (102A)(103A). In accordance with the present invention, such opening (12) is of a small width (1) relative to a width (W) of the headrest frame (2) or of the two through-holes (10)(11). Since other portions of this second mode of headrest (A) are identical to those of the previously described first mode of headrest (A), all like designations to be given hereinafter correspond to all like designations given in the first embodiment shown in FIGS. 1 and 2, and therefore, further detailed explanation on the common portions is deleted for the sake of simplicity. Hence, all the steps of assembling together the trim cover assembly (1) and headrest frame (2) as well as all the steps of subjecting them to a foaming are effected in the same manner as stated previously. FIGS. 4, 5 and 6 show a resultant headrest (A) formed in the present second mode. Likewise as in the first embodiment, the fact that the width (W1) of elongated opening (12) is smaller than the width (W) of headrest frame (2) or of two through-holes (10)(11) is advantageously effective in more reducing the possibility that the liquid foaming base material injected in the trim cover assembly (1) will be leaked from the opening (12), during the foaming process, in comparison with the conventional headrest structure wherein an opening of a greater width than that of such opening (12) is provided.

It is therefore appreciated that, in accordance with the present invention, the elongated opening (12) of a small width relative to that of opening of conventional headrest, which has the above-discussed leakage prevention effect, may be applied to both of the foregoing first and second typical modes of headrest so as to minimize the possibility of liquid base foaming material being leaked from the opening (12) during foaming process and avoid any aesthetically impaired or objectionable portion of resultant headrest which causes from such leakage. In particular, with regard to the second mode of headrest having the recessed lower side, as the opening (12) is provided on the flat plane of third and fourth cover sections (102A)(103A), it is easy to mount an additional sealing member or means thereon between the two inclined cover sections (104)(105), to thereby insure to preclude leakage of a liquid base foaming material from the opening (12).

While having described the present invention thus far, it should be understood that the invention is not limited to the illustrated embodiments, but any other modifications, replacements and additions may be applied thereto without departing from the scopes of the appended claims.

What is claimed is:

1. A headrest which is formed by placing a generally "M" shaped headrest frame having a pair of stay portions in a three-dimensional trim cover assembly, then injecting a liquid foaming base material into an inside of the three-dimensional trim cover assembly, and creating a foam padding therein together integrally with the generally "M" shaped headrest frame and three-dimensional trim cover assembly, with said pair of stay portions projecting outwardly from the three-dimensional trim cover assembly, said headrest comprising:

a cover section of said three-dimensional trim cover assembly which forms one side of said particular trim cover assembly;

a pair of through-holes formed in said cover section, through which said pair of stay portions pass, respectively, and project outwardly from said one side of the three-dimensional trim cover assembly;

an opening means defined in said one side such as to be disposed between said pair of through-holes said opening means allowing said generally "M" shaped headrest frame to be inserted therethrough in to the inside of said three-dimensional trim cover assembly, and further being provided with a bias means for normally causing the opening means to close in a resilient manner; and said opening means having a width $W_1$, $W_2$ which is smaller relative to a width W between said pair of throughholes, hereby preventing said liquid base foaming material from leaking through the opening means to an outside of said trim cover assembly.

2. The headrest according to claim 1, wherein said opening means is of a size allowing an inner side of said three-dimensional trim cover assembly to be taken out therefrom and therethrough so as to permit reversing of the three-dimensional trim cover assembly.

3. The headrest according to claim 1, wherein said cover section of the trim cover assembly includes an elastic layer having an elastic recovery property, and wherein said bias means comprises said elastic layer, so that said opening means is normally biased to close in resilient manner due to the elastic layer.

4. The headrest according to claim 3, wherein said opening means comprises an elongated opening formed in said cover section of said three-dimensional trim cover assembly.

5. The headrest according to claim 1, wherein said trim cover assembly is of a three-layer laminated structure comprising a top cover layer, a foam padding layer and a back cover layer in this order, and wherein said bias means comprises said foam padding layer.

6. The headrest according to claim 1, wherein said cover section include a pair of cover sections, wherein said pair of cover sections includes an elastic layer having an elastic recovery property, wherein said bias means comprises said elastic layer included in each of said pair of cover sections, wherein a pair of extensions are each formed with the respective said pair of cover sections, wherein said pair of extensions project inwardly of said three-dimensional trim cover assembly while being resiliently contacted with each other due to said elastic recovery property of the elastic layer within the three-dimensional trim cover assembly, and wherein said opening means comprises an elongated opening defined between said pair of extensions, so that said elongated opening is normally closed by and between said pair of extensions being thus contacted with each other.

7. A headrest which is formed by placing a generally "M" shaped headrest frame having a pair of stay portions in a three-dimensional trim cover assembly, then injecting a liquid foaming base material into an inside of the three-dimensional trim cover assembly, and creating a foam padding therein together integrally with the generally "M" shaped headrest frame and three-dimensional trim cover assembly, with said pair of stay portions projecting outwardly from the three-dimensional trim cover assembly, said headrest comprising:

a cover section of said three-dimensional trim cover assembly which forms one side of said particular trim cover assembly;

said one side including a recessed area which has a pair of inclined or vertical local areas and a flat local area between said pair of inclined or vertical local areas;

a pair of through-holes so formed in said one side as to lie on opposite sides of said recessed area, through which pair of through-holes, there pass said pair of stay portions, respectively, which further project outwardly from an area of said one side excepting said recessed area;

an opening means defined in said flat local area of said recessed area such as to be disposed between said pair of through holes, said opening means allowing said generally "M" shaped headrest frame to be inserted therethrough into the inside of said three-dimensional trim cover assembly, and being provided with a bias means for normally causing the opening means to close in a resilient manner; and said opening means having a width W relative to a width $W_2$ between said pair of through-holes, hereby preventing said liquid base foaming material from leaking through the opening means to an outside of said trim cover assembly.

8. The headrest according to claim 7, wherein said cover section of the trim cover assembly includes an elastic layer having an elastic recovery property, and wherein said bias means comprises said elastic layer, so that said opening means is normally biased to close in resilient manner due to the elastic layer, so that said opening means is normally biased to close in a resilient manner due to the elastic recover property of said elastic layer.

9. The headrest according to claim, 7, wherein said opening means comprises an elongated opening formed in said cover section of said three-dimensional trim cover assembly.

10. The headrest according to claim 7, wherein said trim cover assembly is of a three-layer laminated structure comprising a top cover layer, a foam padding layer and a back cover layer in this order, and wherein said bias means comprises said foam padding layer.

11. The headrest according to claim 7, wherein said flat local area associated with said cover section, there is provided a pair of another cover sections, wherein said pair of another cover sections include an elastic layer having an elastic recovery property, wherein said bias means comprises said elastic layer included in each of said pair of cover sections, wherein a pair of extensions are each formed with the respective said pair of cover sections, wherein said pair of extensions project inwardly of said three-dimensional trim cover assembly while being resiliently contacted with each other due to said elastic recovery property of the elastic layer within the three-dimensional trim cover assembly, and wherein said opening means comprises an elongated opening defined between said pair of extensions, so that said elongated opening is normally closed by and between said pair of extensions being thus contacted with each other.

\* \* \* \* \*